Figure 1:
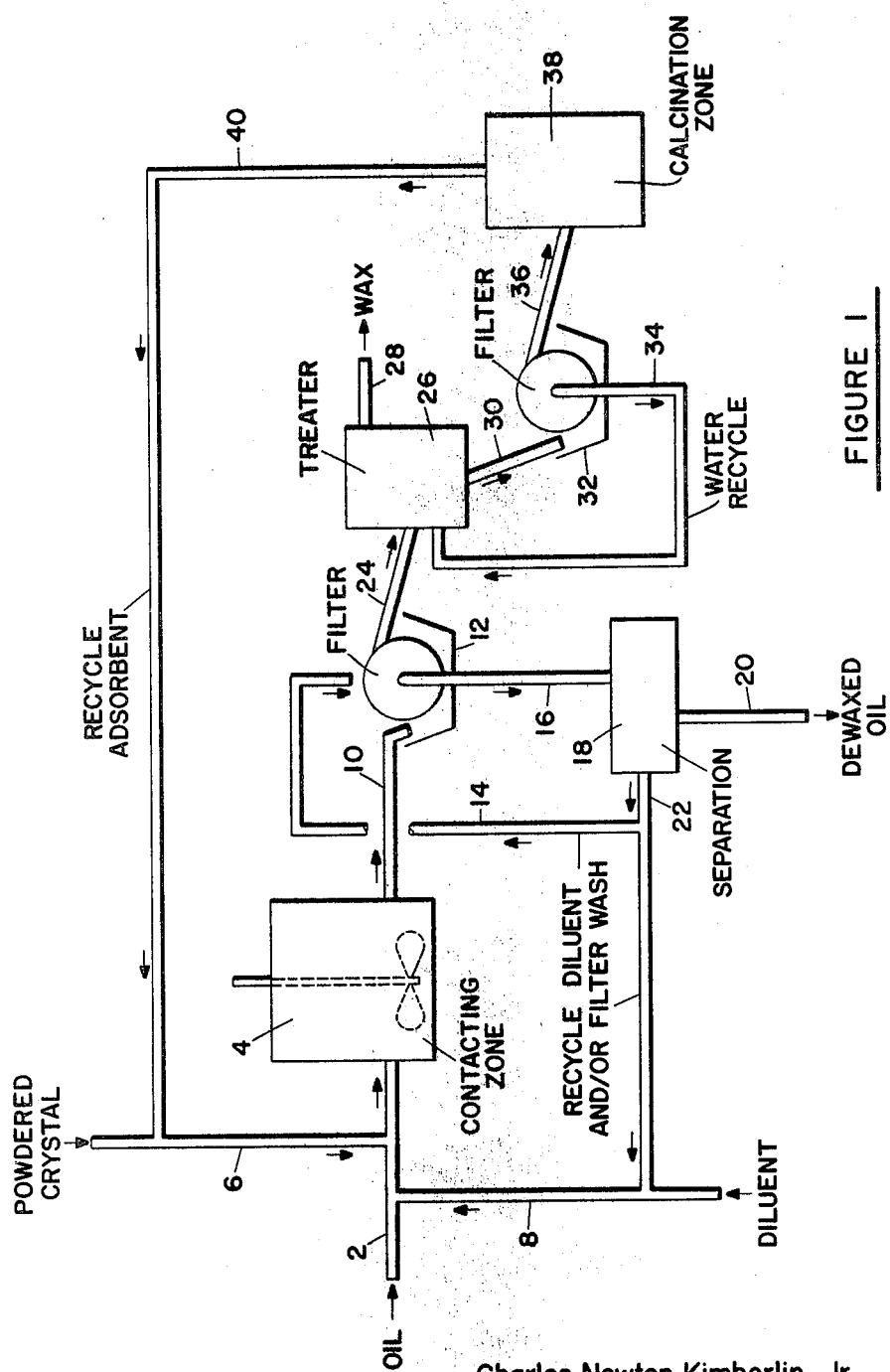

March 29, 1966  C. N. KIMBERLIN, JR., ET AL  3,243,366
DEWAXING BY CONTACT WITH A CRYSTALLINE ZEOLITIC ADSORBENT
Filed Aug. 18, 1958  2 Sheets-Sheet 2

Charles Newton Kimberlin, Jr.
William Judson Mattox   Inventors

By Richard W. Nagel
                        Attorney

United States Patent Office 3,243,366
Patented Mar. 29, 1966

3,243,366
DEWAXING BY CONTACT WITH A CRYSTALLINE ZEOLITIC ADSORBENT
Charles Newton Kimberlin, Jr., and William Judson Mattox, Baton Rouge, La., assignors to Esso Research and Engineering Company, a corporation of Delaware
Filed Aug. 18, 1958, Ser. No. 755,774
3 Claims. (Cl. 208—26)

The present application is a continuation-in-part of Serial No. 639,430, filed February 11, 1957, now abandoned.

The present invention relates to the dewaxing of middle distillates and hydrocarbon oils to prepare premium fuel, heating, lubricating and diesel oils. More particularly, the present invention relates to a novel process for obtaining a high degree of wax removal from these compositions by means of solid adsorbents.

In the refining of hydrocarbon oils such as petroleum oils, it is known to segregate paraffin waxes from so-called paraffin distillates, waxy lubes and the like. The segregation of these waxes is secured by a number of processes, such as by chilling to effect crystallization, chilling in the presence of a solvent such as a liquefied normally gaseous hydrocarbon as propane, or solvent extraction as by a ketone. These processes all have substantial cooling requirements involving considerable refrigeration expenses.

In accordance with the present invention, oils are dewaxed by contacting with a highly selective metallic alumino-silicate crystalline composition having pore openings of uniform size large enough to admit freely the predominantly straight chain wax molecules but which will not admit the isomeric paraffins constituting the bulk of the oil being dewaxed. The pore openings must therefore be about 4.5 to 5.5 angstrom units. Smaller openings exclude most normal hydrocarbons while larger openings would not exclude the isoparaffins, thus adversely affecting the selectively of the crystalline composition.

Alumino-silicates of high dewaxing activity may be prepared by controlled mixing under carefully controlled conditions, sodium silicate, and preferably sodium metasilicate, with sodium aluminate to form a crystalline product which is subsequently base exchanged with a metallic ion such as calcium. The sodium silicate should have a high ratio of soda to silica of at least 0.8/1 and as high as 2/1. Water glass or sodium silicates having a lower $Na_2O/SiO_2$ ratio do not form the selective adsorbent crystals unless subjected to extended heat soaking or crystallization periods.

Sodium aluminates having any ratio of $Na_2O/Al_2O_3$ in the range of 1/1 to 3/1 may be employed; a sodium aluminate having a high ratio of soda to alumina is preferred; a ratio of 1.5/1 $Na_2O/Al_2O_3$ is desirable. The amounts of sodium silicate solution and sodium aluminate solutions are such that the ratio of $SiO_2/Al_2O_3$ in the final mixture is in the range of 0.8/1 to 3/1, and preferably about 1/1 to 2/1.

The method of mixing the sodium metasilicate and aluminate must be carried out in a manner allowing formation of a precipitate having a uniform composition. A preferred method is to add the aluminate to the metasilicate at ambient temperatures using rapid and efficient agitation to make a homogeneous paste. Thereafter the mixture is heated to about 180° to 215° F. for a period of about 0.5 to 3 hours or more. The crystals are also formed at lower temperatures, but a greater length of time is needed. However, above about 250° F., crystalline compositions having the desired uniform size pore openings are not obtained.

An important step in the preparation is to have the crystallization take place in an alkaline medium, at a pH greater than about 12. At lower pH levels, crystals with the desired properties are not as readily formed.

After the crystallization step, the crystals are washed and added directly to a solution of a salt, such as an aqueous calcium chloride solution. After contact time of five minutes to an hour, the final product, now having a uniform pore opening of about 5 Angstroms, is filtered, washed, and activated by calcination at about 700° to 900° F. Other alkaline earth metals, such as magnesium and barium, and Group III metals, iron, nickel, cobalt and the like, may also be employed.

In accordance with the present invention, this crystalline composition in which about 65% or more of the sodium has been exchanged for calcium or other metallic ion is employed in dewaxing middle distillates and lube stocks. The dewaxing may be carried out (1) in the vapor phase at reduced pressure or with a non-adsorbable carrier oil, or (2) in liquid phase at elevated temperatures or with the heavy oil diluted with light, non-adsorbable oil, i.e., an oil whose molecules have diameters greater than 5 angstrom units. A fixed-bed or slurry operation may also be employed.

The process of the present invention may be more readily understood by reference to the drawings illustrating preferred embodiments of the same.

Referring specifically to FIGURE 1, a waxy distillate boiling in the gas oil range or above is passed via line 2 to contacting zone 4. Finely divided calcium sodium alumino-silicate having a uniform pore diameter of about 5 Angstroms is passed into vessel 4 via line 6. Vessel 4 is provided with efficient agitation and is maintained at a temperature of about 300° to 750° F., preferably 400° to 650° F., and oil-crystal contacting is maintained for a period sufficient to adsorb the wax constitutents and components; the residence period varies with the percent wax content, and may be from 5 to 60 minutes. If desired, a light, non-normal hydrocarbon fraction such as an iso or a cycloparaffin or aromatic may be admitted through line 8 to act as oil diluent and contact promoter, particularly where the oil has a high viscosity.

The slurry of oil and adsorbent, with or without added diluent, is then passed to filtration zone 12 where the adsorbent is removed from the liquid in a conventional manner. Additional non-adsorbable light hydrocarbon may be employed as a wash liquid, being introduced via line 14. The filtrate, consisting of dewaxed oil and diluent, is withdrawn through line 16, separated by a simple distillation into a diluent and a diluent-free heavy fraction, and the diluent is recycled via line 22, while the dewaxed oil is recovered through line 20.

The wax-containing adsorbent is now transferred to a regeneration zone. In the embodiment shown in FIGURE 1, the adsorbent is passed to hot water treating zone 26 where, at a temperature of about 150° to 300° F. and appropriate pressures, the sieve is regenerated, the more polar water molecules replacing the adsorbent hydrocarbon molecules in the adsorbent interstices. The molten wax forms an upper layer and is withdrawn through line 28 for recovery and purification in a manner known per se. The aqueous slurry of wax-free adsorbent is passed to filtration zone 32. The adsorbent is passed to calcination zone 38 where, at a temperature of from about 500° to 900° F., the water molecules are expelled from the interstices and pores, and the product is ready for further dewaxing, and so is recycled via line 40 to contacting zone 4.

Instead of water, however, the wax may be removed in zone 26 by other compounds for which the adsorbent has a greater affinity than it has for wax molecules. Thus, low boiling normal olefins such as propylene or butylenes, or lower boiling normal paraffins may be employed. Similarly, normal primary alcohols such as methanol, ethanol, butanol, etc., may be employed. These desorbents have the added advantage that they are displaceable by the wax directly and thus do not require the calcination step and heat treatment necessary when water is the desorbing agent.

Figure 2:
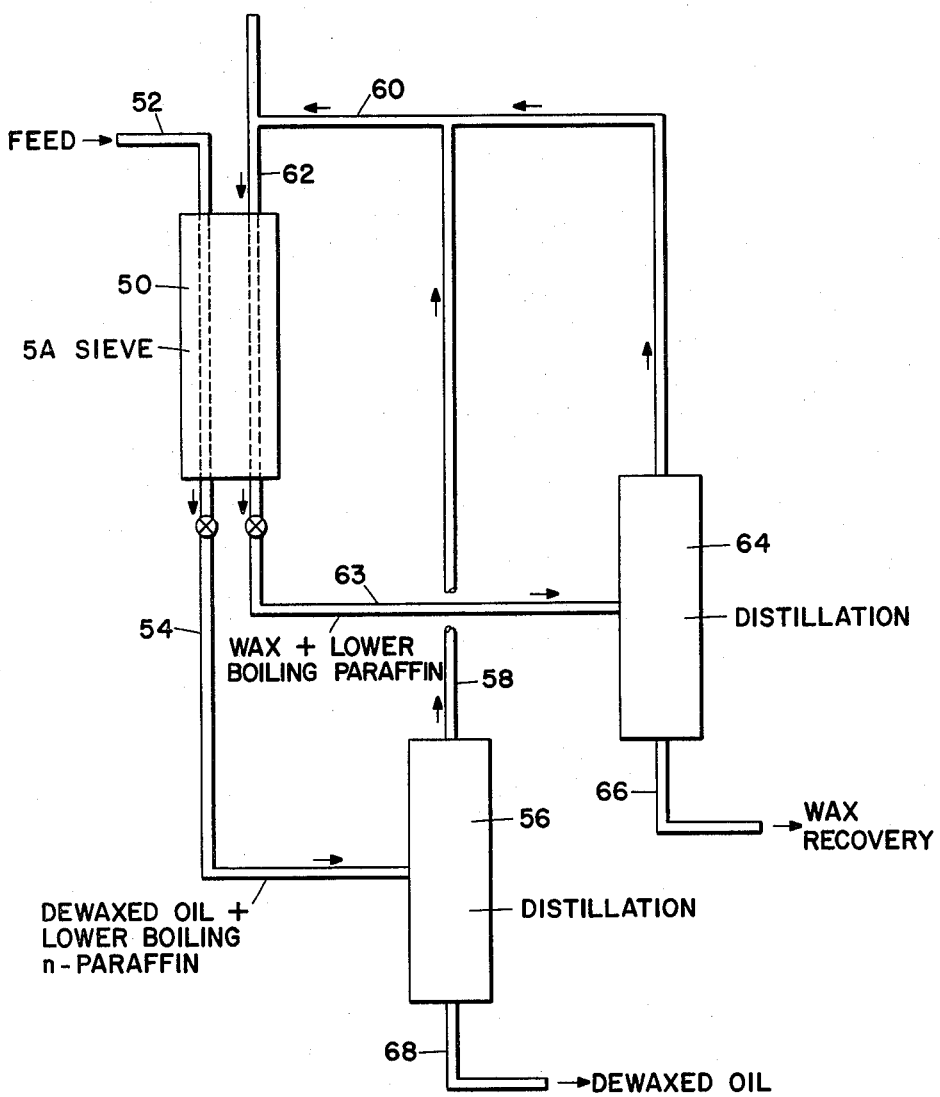

A second preferred embodiment of the invention is shown in FIGURE 2 wherein instead of a slurry process, a fixed-bed operation is described. Furthermore, a preferred method of desorbing the wax with a lower boiling portion of the normal paraffins distilled from the desorbate is also included.

Turning now to FIGURE 2, a wax-containing gas oil or lubricating stock is passed via line 52 into adsorption vessel 50. This latter vessel may be packed with the 5 Angstrom zeolite, or the material be disposed on trays or on supports. The unit is provided with heating means to maintain the desired adsorption and desorption conditions within the vessel. The feed, preferably preheated to 400° to 800° F., is vaporized and passed downwardly through line 52 into vessel 50 at a rate of 0.2 to 5 v./v./hr. Adsorption conditions within vessel 50 include temperatures of 400° to 750° F., pressures of sub-atmospheric to 100 p.s.i.g., depending to a great extent upon the wax content of the oil and the boiling range of the oil being treated. Dewaxed oil, which comprises to a large extent non-normal hydrocarbons and lower boiling normal paraffins, may be passed via line 54 to still 56, wherein lower boiling normal paraffin constituents of the gas, heating or lube oil are distilled overhead through line 58 while the dewaxed oil is recovered through line 68. Such low boiling constituents may boil in the range of from about 350° to 500° F. These low boiling constituents are most readily displaced from the adsorbent by the heavier wax components and, although they may be present in the oil feed in relatively small percentages, they can be concentrated in the recycle system of the process until a sufficient quantity is available for the alternate wax displacement operations. Normal paraffins such as decane, undecane, dodecane, tridecane, tetradecane, etc., will usually boil within the preferred range of displacement paraffins.

When the 5 Angstrom zeolite has become saturated with wax, as evidenced by the increase in pour point of the effluent, fresh feed flow to vessel 50 is discontinued and is preferably switched to a parallel adsorption unit, and the desorption cycle begins. As desorbent, there is employed in this embodiment of the present invention a relatively low boiling straight chain paraffin constituent of the oil being dewaxed. This material may have about 10 to 14 carbon atoms, and it is highly effective in displacing adsorbed wax which also is normal paraffinic composition. Preferably, in the desorption cycle, the desorbent is pretreated to 400° to 800° F. and passed as a vapor through line 62 into adsorber 50. Desorption conditions are usually essentially isothermal, although in some instances with heavy waxes it may be desirable to carry out the wax displacement at a temperature approximately 100° to 200° F. above that most suitable for wax adsorption. Initially, desorbent may be passed in through line 62, but in succeeding cycles, the recovered desorbent is recycled as described below.

The vaporized, desorbed wax and displacing agent are passed via line 63 to distillation zone 64, where the displacing agent may readily be recovered as an overhead stream through line 60, while wax is recovered through line 66. The displacement continues until substantially no more wax appears in the effluent through line 63, and thereafter the feed oil stream is cut in again as described. The newly adsorbed wax displaces the lower boiling desorbent fraction described above, and the latter, along with unadsorbed oil, is withdrawn through line 54. Any small amount of lower boiling n-paraffins remaining in the dewaxed oil recovered through line 68 will have no appreciable adverse effects on the pour and cloud point of the oil.

The process of the present invention may be modified in many respects without departing from its spirit. Thus, it may be desirable to introduce the slurry of adsorbent into the trays of a fractionating tower wherein a lubricating oil fraction is being distilled. The settled wax-containing adsorbent may then be restored in the manner already described. Also, a lubricating oil may be simultaneously dewaxed and its viscosity index upgraded by employing, along with the selective adsorbent described, a second adsorbent having slightly larger pores, from 6 to 15 Angstroms, to remove aromatic impurities. The latter type adsorbents are produced in a manner similar to the first named desorbent except that the ratio of $SiO_2$ to $Al_2O_3$ in the reaction mixture is from 3/1 to 10/1 and a somewhat longer heat soaking period is required.

Furthermore, from time to time the sieve may accumulate sufficient polymeric or carbonaceous contaminants to require regeneration, which may be accomplished by controlled burning with a small amount of an oxygen-containing gas such as dilute air. Also where operating at the higher adsorption temperatures of 600° to 750° F. it may be desirable to include hydrogen to suppress possible product degradation. Under certain circumstances, when fixed-beds are employed, it may be desirable to employ certain gases, such as $N_2$, $H_2$, or natural gas, to strip wax from the sieves.

The process of the present invention may be further illustrated by the following specific examples.

*Example 1*

A crystalline alumino-silicate adsorbent having 5 Angstrom pore openings was synthesized as follows:

(1) Reagents: Dissolve sufficient metso-granular sodium metasilicate (available from the Philadelphia Quartz Company) in distilled water to give a 19.1% concentration of $Na_2SiO_3$. Place 250 grams of this material in the reaction beaker. In another beaker, weigh out 100 grams of Nalco #2 sodium aluminate solution. This is a sufficient quantity to combine with the silicate solution and give an $SiO_2$ to $Al_2O_3$ ratio of 2/1.

(2) Mix the two solutions at room temperature by pouring the aluminate into the silicate while stirring vigorously.

(3) Quickly raise the temperature of the above mixture to 200° F. by placing the beaker in a constant temperature bath and stirring rapidly. Maintain this slurry at the desired temperature for three hours.

(4) Pour the product onto cracked ice to stop reaction.

(5) Filter with suction and wash the filter cake with one liter of distilled water.

(6) Dry the product overnight at 200° F. Analysis of this material showed the composition to be $$Na_2O \cdot Al_2O_3 \cdot 2SiO_2$$

(7) Convert the above sieve product (4 Angstrom type) to the calcium form (5 Angstrom) with an excess of calcium chloride solution. This exchange is carried out by soaking 1 part (by weight) of the 4 Angstrom powder in 10 parts of 20% calcium chloride solution. After soaking approximately one hour, the adsorbent powder is filtered, washed by reslurrying several times in water, filtered, dried overnight in an oven at 225° F., and then calcined two hours at 850° F. Chemical analysis showed that 70% of the sodium had been replaced by calcium.

*Example 2*

A gas oil having a boiling range of 354° to 700° F. (ASTM distillation), and API gravity of 31.8 and a pour point of 38 was slurried with the powdered material prepared in a manner similar to the above, in the proportion of 7.3 and 14.6 pounds powder per gallon of oil, and heated to 575° F. The slurry was then cooled to 180° F. and filtered, the filter cake washed with benzene, and the benzene removed from the dewaxed oil by distillation. The dewaxed oil was recovered with a volumetric yield of 85.9% and had an API gravity of 29.5.

TABLE I
ADSORBENT TREATING OF HEAVY GAS OIL FOR WAX REMOVAL

| Test No. | Adsorbent Treat | | Wax Removed, Percent | Pour Point of Treated Oil |
|---|---|---|---|---|
| | Lb. Sieve/ Gal. Oil | Temp., °F. | | |
| Feed | 0 | | 0 | 38 |

SLURRY TREATS

| | | | | |
|---|---|---|---|---|
| 384 | 7.3 | 200 | 1 | |
| 383A | 7.3 | 315 | 1.2 | |
| 378A | 7.3 | 400 | 11.2 | |
| 385A | 7.3 | 500 | 14.1 | |
| 386 | 7.3 | 575 | 14.5 | |
| 383B | 14.6 | 315 | 1.2 | |
| 378B | 14.6 | 400 | 13.7 | |
| 385B | 14.6 | 500 | 14.1 | |

FIXED-BED PARTIAL VAPOR PHASE TREAT

| | | | | |
|---|---|---|---|---|
| 372 | 11.5 | 400 | 14.0 | −30 |

It will be noted that at 315° F. and below, only about 1% of wax, based on total oil, was removed, while at 400° F., 11.2 to 13.7% is readily adsorbed by the selective adsorbent. These data show a very sharp and critical division of less than 85° F. between operable adsorption temperatures and unsatisfactory contacting conditions. The same temperature effect was obtained at both the 7.3 and the 14.6 pounds per gallon treating level. A fixed-bed treat made in partial vapor phase at 400° F. (test 372) using benzene as a non-adsorbable carrier oil gave results quite similar to the slurry treats at the same temperature and comparable adsorbent/oil ratios. The pour point of this oil was reduced from +38 to −30.

Example 3

A lubricating oil stock having an API gravity of 28.0 and a boiling range of 668° to 755° F. (5% and 95% points on an ASTM distillation) was slurried with an adsorbent material, prepared as in Example 1, in the proportion of 7.5 pounds per gallon of oil and heated to 700° F. for one hour. The slurry was then cooled to 180° to 200° F. and filtered, the filter cake washed with benzene, and the benzene removed from the dewaxed oil by distillation. The dewaxed oil was recovered in a yield of 86.9 vol. percent. Other treats were made in the same manner at temperatures of 500° and 650° F. At the lower temperature, only 1.8% of wax was removed; at 650° F. the wax adsorption amounted to 7%.

It is further to be understood that instead of the natural or synthetic zeolites described as suitable for this purpose, other adsorbents having uniform pore openings of about 5 Angstrom units may be employed. Thus, certain activated carbons have been found to have unifore pore openings of this size and may be used for this service.

Example 4

Table II below shows an advantage, under certain conditions, to adsorption of waxes from middle distillates at low pressures. To take advantage of the high selectivity at low pressures, it is desirable to employ a reduced pressure operation. Particularly desirable are pressures below about 50 mm. Hg. These pressures are readily obtained by condensation of the middle distillate product where no gas formation occurs. Since high temperature adsorption is accompanied by a certain amount of cracking and consequent gas formation, very low pressures are difficult to obtain. Thus, when temperatures above about 750° F. obtain in the adsorption zone, it is not desirable to employ pressures in the adsorption zone significantly below atmospheric. However, where lower adsoprtion temperatures are employed, pressures as low as 0.1 mm. Hg may be employed concomitantly as dictated by economic considerations.

TABLE II
Sieving middle distillates

EFFECT OF TEMPERATURE

| Pressure | Yield, percent | Temp., °F. | Pour Point Improvement, °F. |
|---|---|---|---|
| 1 atm | 85.5 | 800 | 70 |
| 1 atm | 85.5 | 730 | 30 |
| 1 atm | 96 | 800 | 40 |
| 1 atm | 96 | 730 | 10 |

EFFECT OF PRESSURE

| Temp. | Pressure | Yield, percent | Pour Point Improvement |
|---|---|---|---|
| 730° F | 1 atm | 93 | 15 |
| 730° F | 60 mm | 93 | 15 |
| 730° F | 20 mm | 93 | 20 |
| 550° F | 0.4 mm | 93 | 30 |

Summarizing the relationship between vapor phase adsorption temperature and pressure, these are shown in Table III below:

TABLE III

| | Adsorption Temperature, °F.[1] | Approx. Adsorption Pressure, mm. Hg |
|---|---|---|
| Case 1 | 730–850 | 760 |
| Case 2 | 600–750 | 50 |
| Case 3 | 500–600 | 1 |

[1] Temperature limited by effect of cracking on product.

Example 5

The following data demonstrate the effectiveness of the dewaxing process employing 5 A. type molecular sieve adsorbent in which the wax is desorbed from the sieve and the sieve reactivated for reuse by displacement with a portion of the lower boiling, low melting point, normal paraffins distilled out of the desorbate.

The evaluation of this dewaxing process was made with a 418° to 654° F. boiling range heating oil and normal decane as representative of the displacement hydrocarbons recoverable from the adsorbed normal paraffins. In this operation the wax adsorbed on 5 A. sieve was displaced from the sieve with n-decane and the n-decane was subsequently displaced by dewaxing additional fresh feed. The adsorptions and desorptions were made at 650° F. and the n-decane was separated from the gas oil and wax fractions by distillation. With fresh sieve in the first cycle the pour point of the oil was reduced from 35° to −70° F. For the displacement of the wax, a total of 0.9 volume of n-decane per volume of sieve was used although this may be in excess of the amount needed since 60% of the wax was displaced with only 0.25 v./v. Fresh feed was then charged to the sieve bed to produce a dewaxed oil-decane effluent which was distilled to remove the decane. The dewaxed oil was recovered in three periods (equal volumes) and had pour points of −70°, −70°, and −60°, or an average of −67° F. The volume of dewaxed oil of this pour point amounted to 60% of the volume treated to the same quality with fresh sieve. This decrease in capacity is to be expected since the lower boiling n-decane cannot completely displace the heavier wax molecules. The use of higher boiling n-paraffins for the displacement such as undecane or dodecane fractions recoverable from the separated wax fractions, would increase the capacity for wax adsorption.

Example 6

To point up the improvement obtained when dewaxing a middle distillate virgin gas oil boiling in the range of 560° to 654° F. in a fixed bed of the zeolite, the following data are considered. Dewaxing occurred in the vapor phase at 650° F. and flow rate of 0.3 v./v./hr.

|  | Feed | Dewaxed Product |
|---|---|---|
| Pour Point, °F | 40 | −40 |
| Cloud Point, °F | 40 | −26 |
| Aniline Point, °F | 174 | 158 |
| Gravity, °API | 33 | 30 |
| Diesel Index | 57 | 47 |

$$\text{The Diesel Index} = \frac{(\text{Aniline Point, °F.})(\text{Gravity, API})}{100}$$

The decrease in diesel index of the product indicates a decrease of 5–10 cetane numbers from the feed at the −40° F. pour point level.

Besides the use of the decanes and higher fractions, it is also within the scope of the present invention generally to desorb the adsorbed wax by displacement with a paraffin of the same or somewhat lower heat of adsorption. Thus, it is possible to displace a $C_{30}$ paraffin having a heat of adsorption of about 300 B.t.u. per pound with a $C_{20}$ paraffin having approximately the same heat of adsorption. Since the $C_{30}$ paraffin has a boiling point substantially higher than the $C_{20}$ paraffin, the products are then separable from the effluent by distillation. Thus, when it is desired to separate, say, 10% of wax in an oil boiling from 600° to 700° F., the wax is adsorbed on a sieve as hitherto described. After the sieve is saturated it is washed with an oil containing 10% paraffin of the same boiling range, boiling from about 400° to 500° F. The lower boiling wax displaces the higher boiling and the latter is then separated from the lower boiling oil effluent as a bottoms product. To complete the cycle, when the higher boiling oil is again charged to the adsorbent the higher boiling wax displaces the lower boiling wax and the latter is distilled out of the higher boiling oil.

It may also be desirable to introduce hydrogen during the cycle. Hydrogen gas may be introduced during the adsorption part of the cycle, the desorption part of the cycle or during both parts of the cycle. The effect of this addition is to minimize cracking, particularly at higher temperatures.

What is claimed is:

1. The process for separating waxy straight-chain hydrocarbons from a hydrocarbon oil containing the same which comprises: contacting said oil in liquid phase with an alumino-silicate zeolitic solid adsorbent, having uniform pores of about 5 A. diameter, at a temperature in the range of 300–700° F. and elevated pressure sufficient to maintain liquid phase during said contacting, whereby said waxy straight-chain hydrocarbons are adsorbed in said solid adsorbent and withdrawing a substantially dewaxed oil from said solid adsorbent.

2. The process of claim 1 wherein said straight-chain hydrocarbons are desorbed from said solid adsorbent with a lighter normal paraffin.

3. The process of claim 1 wherein the said straight-chain hydrocarbon is desorbed from said solid adsorbent with a normal paraffin boiling in the range of 350–500° F.

References Cited by the Examiner

UNITED STATES PATENTS

| 2,574,434 | 11/1951 | Greentree et al. | 260—676 |
| 2,818,137 | 12/1957 | Richmond et al. | 260—676 |
| 2,818,449 | 12/1957 | Christensen et al. | 260—676 |
| 2,818,455 | 12/1957 | Ballard et al. | 260—676 |
| 2,834,439 | 5/1958 | Kinsella et al. | 260—676 |
| 2,886,508 | 5/1959 | Hess et al. | 260—676 |
| 2,886,522 | 5/1959 | Cooper et al. | 260—676 |
| 2,889,893 | 6/1959 | Hess et al. | 260—676 |
| 2,966,451 | 12/1960 | Caesar et al. | 208—26 |

DELBERT E. GANTZ, *Primary Examiner.*

ALLAN M. BOETTCHER, ALPHONSO D. SULLIVAN, MILTON STERMAN, *Examiners.*

F. M. VAN RIET, J. H. HALL, H. LEVINE,
*Assistant Examiners.*